United States Patent [19]
Thompson

[11] 3,767,051
[45] Oct. 23, 1973

[54] SEWAGE TREATMENT VESSEL

[76] Inventor: Alexander David Thompson, 15561 Aster St., Westminster, Calif. 92683

[22] Filed: Oct. 26, 1971

[21] Appl. No.: 192,208

[52] U.S. Cl.............. 210/197, 210/202, 210/206, 210/207, 210/221, 210/260, 210/522, 210/539
[51] Int. Cl............................................ B01d 21/01
[58] Field of Search................... 210/63, 68, 201, 210/202, 206, 207, 221, 256, 260, 539, 521, 522, 220, 197

[56] References Cited
UNITED STATES PATENTS

| | | | |
|---|---|---|---|
| 3,202,285 | 8/1965 | Williams | 210/221 X |
| 3,677,409 | 7/1972 | Ferm et al. | 210/221 X |
| 3,679,053 | 7/1972 | Koulovatos et al. | 210/202 X |
| 2,852,140 | 9/1958 | MacLaren | 210/220 UX |

Primary Examiner—Samih N. Zaharna
Assistant Examiner—F. F. Calvetti
Attorney—Henry M. Bissell

[57] ABSTRACT

A sewage treatment vessel for primary, secondary and tertiary treatment of sewage having a primary settling chamber, an aeration chamber having staggered transversely extending baffles therein for improved aeration, a clarifying chamber receiving effluent from the aeration chamber, and chlorinating means for removing the effluent from the clarifying chamber, the clarifying chamber having a tapered wall portion and an opening at the lowermost portion thereof communicating with the aeration chamber to provide further aeration of the effluent therein. The vessel is constructed of fiberglass and the inner wall portions of the vessel are arcuate and provided with ribs for strengthening thereof and to assist in the aeration process.

9 Claims, 8 Drawing Figures

PATENTED OCT 23 1973

INVENTOR
ALEXANDER D. THOMPSON
BY Henry M. Bissell
ATTORNEY

INVENTOR
ALEXANDER D. THOMPSON
BY Henry M. Bissell
ATTORNEY 3,767,051

SEWAGE TREATMENT VESSEL

BACKGROUND OF THE INVENTION

This invention relates to sewage treatment systems and, more particularly, to a lightweight, non-corrosive single tank system for private and semi-public use.

With the housing and construction boom of the past 20 years many subdivisions and residences have spread beyond existing sewer lines, thereby creating an increasing need for small waste treatment plants which are transportable, efficient, maintenance-free and capable of delivering a clear, sediment-free, completely odorless and stable effluent suitable for disposal into a convenient run-off ditch or free-flowing stream.

Furthermore, in some instances the residences are of the cabin or resort type which are in remote locations with secondary or unimproved road access. The self-contained sewage treatment systems currently available for such use are of reinforced concrete construction and are very bulky in configuration. Furthermore, lifting means such as a crane is necessary to load and unload the tanks of this type of construction. Due to the inaccessible locations in some instances the transporting and erection of such sewage vessels is a considerable problem. The large weight and bulk of such prefabricated systems as are known virtually prohibits their shipment over any considerable distance. Yet the need for such systems is particularly critical in rural and remote areas. In some regions the underground water table is such that septic tanks and cesspools are not permitted under modern building codes. Therefore complete, self-contained systems are a necessity for the proper treatment of sewage in such areas. Moreover, in instances where chlorination is desired, as in the partial or complete recycling of waste water, an additional system has been necessary at additional expense with the need for extra space for such facilities.

It is, accordingly, an object of this invention to provide a complete residential size sewage treatment system in a new and improved sewage treatment vessel of lightweight, compact construction.

It is another object of this invention to provide a new and improved sewage treatment vessel for such a system having a high degree of efficiency in the treatment of sewage.

It is a further object of this invention to provide a new and improved sewage treatment vessel having primary, secondary and tertiary treatment of sewage in a single, self-contained unit.

It is a still further object of this invention to provide a new and improved sewage treatment vessel utilizing extended aeration treatment of the sewage.

It is still another object of this invention to provide a new and improved sewage treatment vessel which may optionally be provided with chlorinating means for further purification of the final effluent.

SUMMARY OF THE INVENTION

The foregoing and other objects of the invention are accomplished by providing a sewage treatment vessel constructed of fiberglass, having generally arcuate shaped inner surfaces for the top, bottom, and side walls thereof, with all inner surfaces being provided with reinforcing ribs which also assist in breaking up large particles during the agitation of the effluent therein. The vessel contains a primary settling chamber for receiving raw sewage, an aeration chamber having a plurality of staggered, transversely extending baffles therein to optimize passage of oxygen to the effluent during the digestion process and a clarifying chamber for receiving the overflow from the aeration chamber. The clarifying chamber is provided with a sloped wall portion having an opening adjacent the lower edge thereof for reintroducing the sedimentary particles therein back into the aeration chamber for further digestion and decomposition. The ribs on the inner surfaces, in addition to providing strength and rigidity to the vessel, also serve to increase the effective surface area exposed to the effluent therein. This advantageously increases the agitation therein to assist in the breaking up of larger particles more efficiently. The arcuate inner surfaces of the vessel are especially useful in recirculating the effluent in the primary chamber and the aeration chamber to further promote the efficient decomposition of sewage therein to permit the vessel to be extremely compact.

In accordance with a further aspect of the invention, the clarifying chamber may be further divided to provide a chlorine chamber to chlorinate the processed effluent which can then be pumped out through a diatomaceous filter into leaching fields or other disposal systems. The chlorine tank is so disposed within the vessel so that a minimum surface area of the tank is exposed to the outer surface of the vessel to prevent freezing of the purified fluid therein.

BRIEF DESCRIPTION OF THE DRAWINGS

The invention can be better understood with reference to the specification when taken in conjunction with the drawings, in which.

DESCRIPTION OF THE PREFERRED EMBODIMENT

Description of the Apparatus

Figure 1:
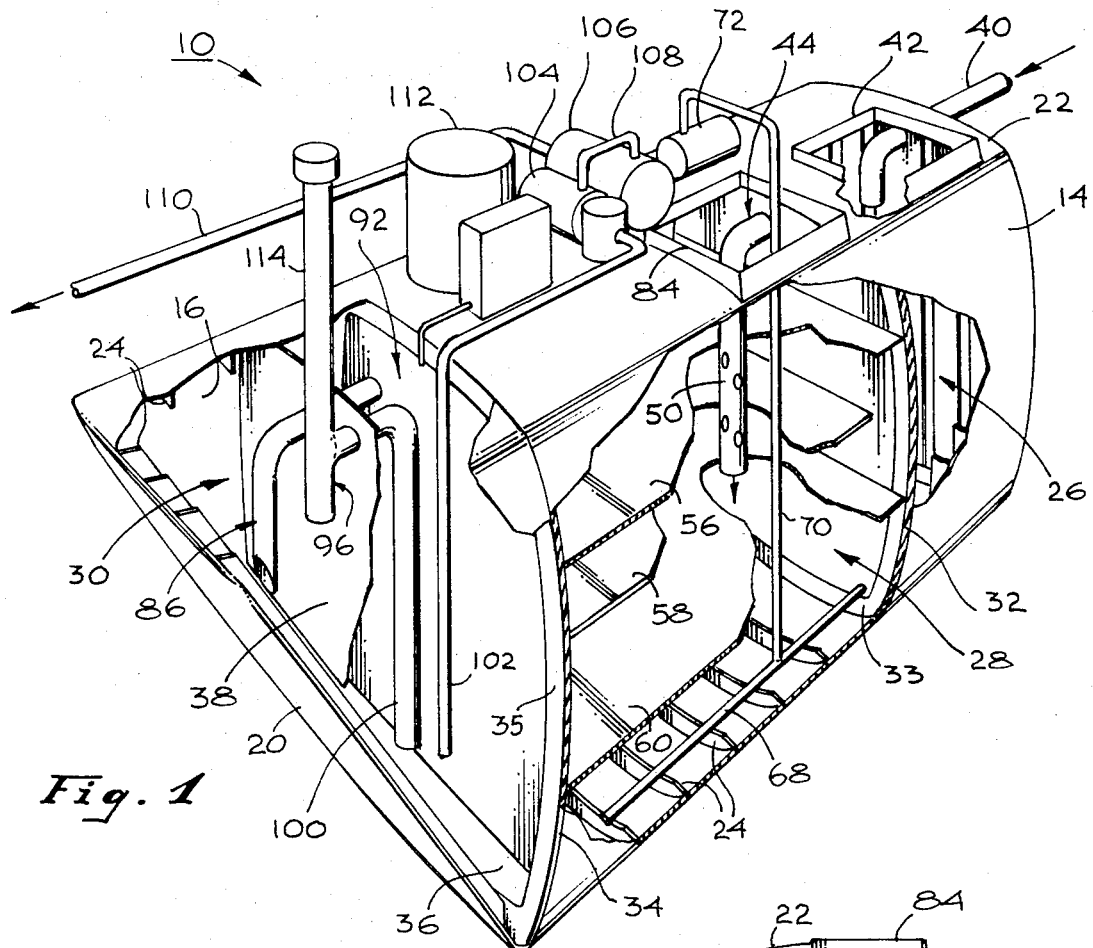
FIG. 1 is an isometric view partially broken away of the sewage treatment vessel according to the invention.
Figure 2:
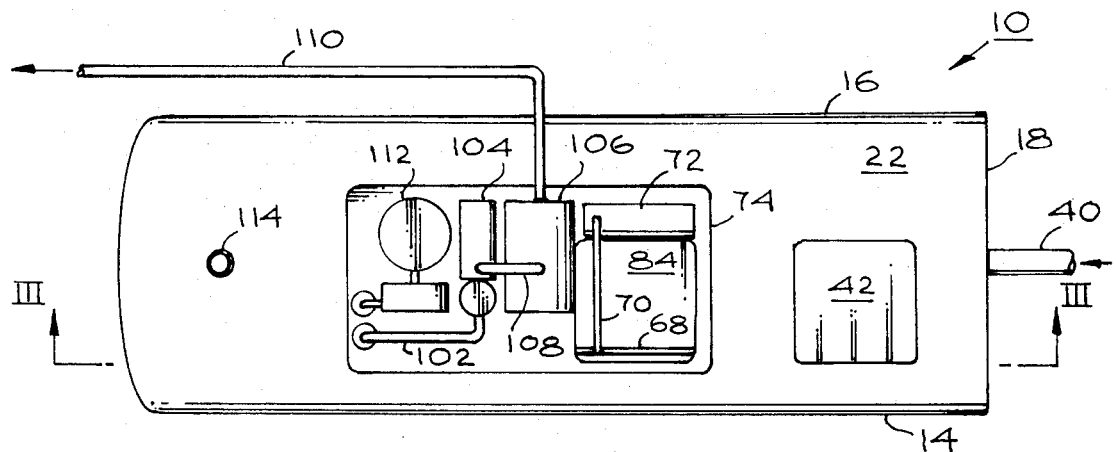
FIG. 2 is a top plan view of the sewage treatment vessel of FIG. 1.
Figure 3:
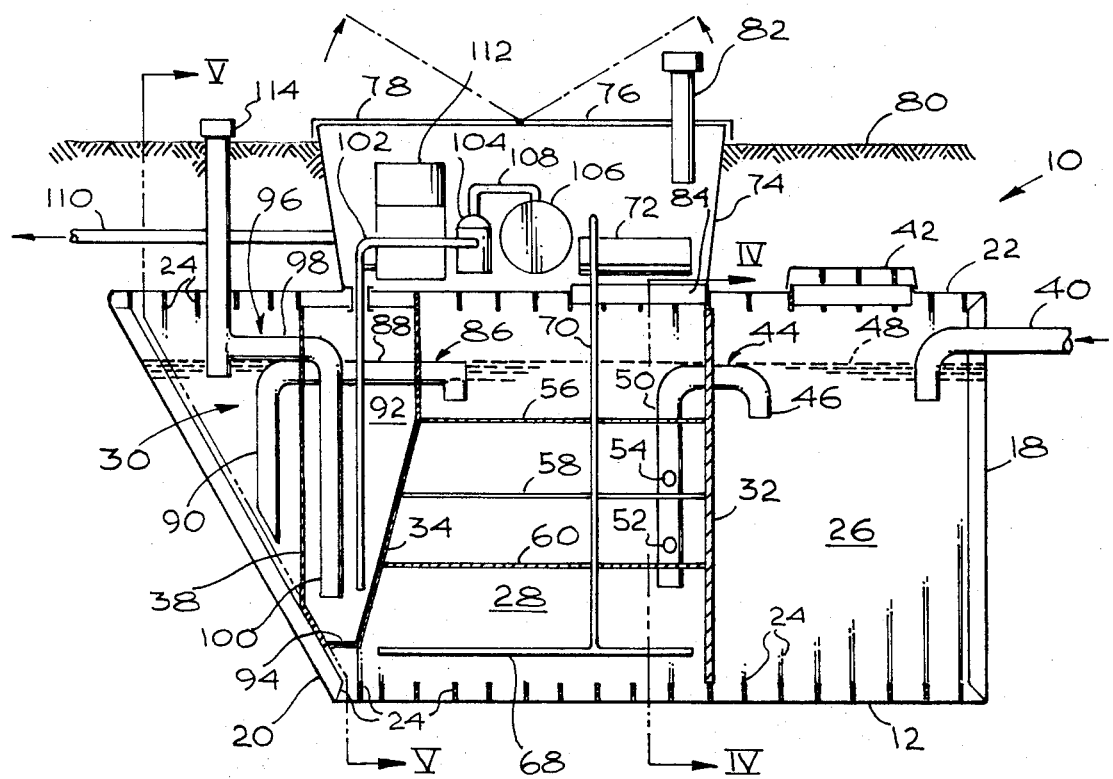
FIG. 3 is a cross-sectional view of the sewage treatment vessel of the invention taken along line III—III of FIG. 2.

Referring now to the drawings and particularly to FIGS. 1, 2 and 3, there is shown a sewage treatment vessel broadly indicated by reference numeral 10 which is fabricated from fiberglass or the like. The vessel 10 is intended for mounting below the surface of the ground in the usual manner.

In the preferred form illustrated, the vessel 10 has a bottom 12, sidewalls 14 and 16, a first end wall 18 disposed generally perpendicular to the bottom 12 and an opposing end wall 20 which is angularly disposed with respect to bottom 12 for reasons which will hereinafter be discussed. The vessel 10 is provided with a top 22. The inner surfaces of the bottom 12, top 22, sidewalls 14 and 16 and end walls 18 and 20 are provided with reinforcing ribs 24 to provide structural rigidity while the bottom 12, top 22 and sidewalls 14 and 16 are arcuate in cross-section to further strengthen vessel 10. The supporting ribs 24 may be formed integral with the corresponding member by molding for example, or alternatively the supporting ribs can be built up out of fiberglass tape or woven roving impregnated with resin. The vessel 10 is divided into three distinct compartments including primary settling chamber 26, aeration chamber 28 and clarifying chamber 30. The primary settling chamber 26 is formed between the end wall 18 and a first transverse partition 32. The aeration chamber 28 is formed between the first transverse partition 32 and a second partition 34 which may be positioned substantially perpendicularly to bottom 12 (as shown in FIG. 1) or alternatively may have the tapered configuration shown in FIG. 3. The partition 34 in either case terminates at a fixed height from bottom 12 to form an opening 36 in proximity to the lower edge of tapered end wall 20. The clarifying chamber 30 can be further subdivided by a third partition 38 disposed intermediate partition 34 and end wall 20. In order to provide additional strength, each partition 32 and 34 is reinforced adjacent the periphery thereof by bulkheads 33 and 35 respectively.

Adjacent the upper portion of end wall 18 and extending therethrough is a downwardly extending right-angularly disposed inlet pipe 40 for bringing the raw sewage into the primary settling chamber 26. The top wall 22 is provided with a hatch 42 for access space to the settling chamber 26. Adjacent the upper edge of the transverse partition and extending therethrough is an inverted J-shaped pipe 44 having the short leg 46 thereof communicating with the primary settling chamber 26 so that the upper edge thereof is generally in line with the anticipated fluid level shown by a broken line with reference numeral 48. The longer leg 50 of pipe 44 extends downwardly into the aeration chamber 28, the pipe 44 being open at both ends thereof. Additionally, the longer leg 50 is provided with spaced apertures 52 and 54 at differing heights thereon.

Figure 4:
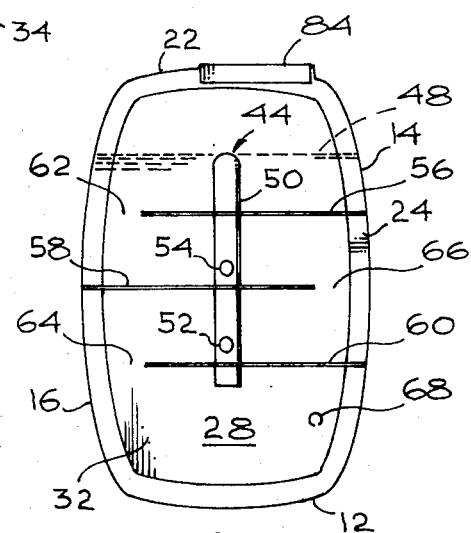
FIG. 4 is a cross-sectional view taken along line IV—IV of FIG. 3.

As illustrated in FIGS. 1, 3 and 4, the aeration chamber 28 has disposed therein three horizontally extending baffles 56, 58 and 60. Baffles 56 and 60 are secured at one end thereof to sidewall 14 and extend outwardly therefrom a distance less than the available width between sidewalls 14 and 16 to provide openings 62 and 64 respectively adjacent the inner surface of sidewall 16. Baffle 58 is positioned midway between baffles 56 and 60 and extends outwardly from the opposite sidewall 16 a distance just short of the inner surface of sidewall 14 to form opening 66. The baffles 56, 58 and 60 are also supported along opposite edges by transverse partitions 32 and 34. The exit end of pipe 44 communicates with the portion of the aeration chamber formed between baffle 60 and bottom 12, the aperture 52 in the long leg 50 of pipe 44 communicates with the portion of the aeration chamber between baffles 58 and 60, while the aperture 54 communicates with the aeration chamber intermediate baffles 56 and 58. Positioned within the lowermost portion is an aerator outlet 68 which is an elongate pipe containing a plurality of spaced apertures (not shown) therein with the apertures pointing downwardly toward bottom 12. Air is fed to the aerator outlet through an upwardly extending pipe 70 connected thereto and terminating at a position externally of the vessel 10 above top 22. An aerator motor and pump 72 pumps air through pipe 70 and through the apertures of aerator outlet 68. The motor and pump 72 is contained within an equipment-housing 74 which can be for example rectangularly shaped having four downwardly depending sidewalls with the top wall 22 of the vessel 10 forming the bottom thereof. The equipment-housing 74 may also be provided with hinged access hatch openings 76 and 78 to enclose the upper end thereof at a height just above ground level 80. The access hatch 76 may also be provided with a suitable vent 82 for venting equipment-housing 74. The aeration chamber 28 is also provided with an access hatch 84 through top wall 22 of vessel 10 for providing access to the aeration chamber 28.

Figure 5:
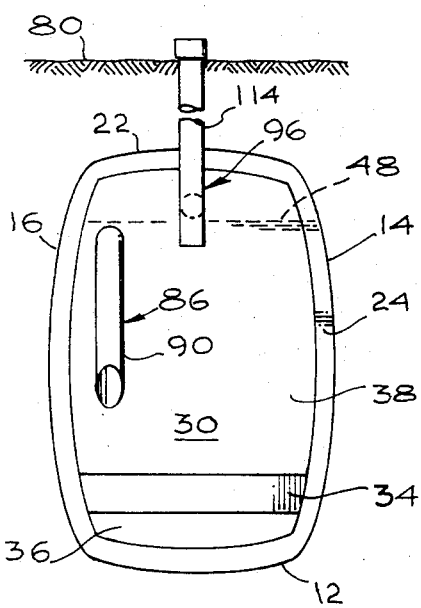
FIG. 5 is a cross-sectional view taken along line V—V of FIG. 3, looking into the clarifying chamber end of the sewage treatment vessel with the end wall thereof removed.

In the embodiment illustrated aeration chamber 28 communicates with clarifying chamber 30 by means of a generally L-shaped inverted pipe 86 having a generally horizontally disposed leg 88 positioned in general horizontal alignment with the upper edge of pipe 44, the open end of leg 88 communicating with the fluid in the aeration chamber 28. The downwardly depending leg 90 of pipe 86 is formed at an angle at the opening thereof, which angle generally corresponds to the angle of end wall 20, the opening of leg 90 being displaced from the inner surface of end wall 20. The leg 88 of pipe 86 extends through both partitions 34 and 38 to bypass the intermediate chamber which is an optional chlorine tank 92 formed by partitions 34, 38 and an interconnecting wall member 94 which interconnects the lower edges thereof. A second inverted generally J-shaped pipe 96 interconnects clarifying chamber 30 with chlorine tank 92 with a horizontally disposed short leg 98 extending through partition 38 so that the lower surface thereof is generally at the fluid level 48 to thereby permit the short leg 98 to serve as a skimming surface. As also shown in FIG. 5, the long leg 100 of pipe 96 extends downwardly into chlorine tank 92 so that the opening thereof is a predetermined distance from interconnecting member 94. Extending downwardly from equipment-housing 74 is a pipe 102 which extends through top 22 of vessel 10 into chlorine tank 92 so that the open end of pipe 102 is in proximity to the open end of leg 100 of pipe 96. Through pipe 102 effluent is discharged by means of a pump 104 which then discharges the fluid through a diatomaceous earth filter 106 by means of interconnecting pipe 108. From the diatomaceous earth filter 106 the fluid is then pumped through outlet line 110 for suitable disposal. Also communicating with chlorine tank 92 is an automatic chlorinator 112 which intermittently provides chlorine to chlorine tank 92. The clarifying chamber 30 may also be provided with an inspection opening by means of an inspection pipe 114, having one end thereof above ground level 80 and the other end thereof communicating with the re-entrant portion of leg 98 of pipe 96.

In an alternate embodiment, if the chlorine treatment is not desired or required, partition 34 may be constructed in a vertical plane (as shown in FIG. 1) and partition 30 is not required, although partition 34 will still terminate at a predetermined distance above bottom 12 of vessel 10 to provide opening 36 between clarifying chamber 30 and aeration chamber 28.

With the particular sewage treatment vessel 10 shown the overall dimensions can be relatively compact while still providing extremely efficient treatment of the sewage. For example, the vessel 10 itself is approximately 12 feet long, 5½ feet high and about 4 feet wide, which makes it relatively transportable with standard vehicles. Furthermore, because of the lightweight construction, the gross weight of the assembled vessel 10 is not substantial when compared with other similar vessels of concrete construction.

Method of Operation

Referring now to FIG. 3, the raw sewage is introduced through inlet pipe 40 into primary settling chamber 26 where the heavy material and grit settle to the floor 12. The primary settling chamber 26 may also be seeded with ripe sludge where the heavy material and grit mix with the ripe sludge and are subjected to biochemical decomposition in the usual manner. In this way, the liquid in the chamber 26 is subjected to considerable gassing and agitation while the organic solids are being broken up by septic decomposition. The agitation is further improved by the increased inner surface available when the solids impinge upon the ribs. As fresh sewage enters through inlet pipe 40 until the sewage achieves the level indicated by line 48, the supernatant liquid containing some of the flocculent material passes through the opening of leg 46 of pipe 44 into the aeration chamber leaving the heavy material behind as sludge in the bottom of settling chamber 26. With the aeration chamber 28 filled to level 48 air is pumped by means of pump 72 through pipe 70 and through the aerator outlet 68.

In both the primary settling chamber 26 and the aeration chamber 28 the arcuate or concave configuration of the inner surfaces as well as the inwardly extending rib members 24 serve a dual function. Structural rigidity is provided with the vessel 10 in its normal buried position with the structure withstanding pressure from the fluid therein forcing its way out as well as the ground around the vessel 10 forcing its way inwardly. In addition to the structural rigidity, the inner concave surfaces assist in the recirculation of the effluent in each of the chambers by eliminating sharp corners and the ribs 24 serve a useful function in speeding up the pulverization of solids contained therein impinging on the ribs 24 as well as the inner surfaces. This latter function is especially important in the aeration chamber 28 where the apertures in aerator outlet 68 point downwardly and upon the release of the atomized air through the apertures, the effluent adjacent aerator outlet 68 is agitated up from the bottom along the curved concave inner surface of bottom 12 to thereby force the activated sludge from the bottom 12 to get the particles in suspension for more efficient digestion and pulverization of solids therein against the increased inner surface available for impact of solids thereon.

When air is atomized through the activated sludge and gets it circulating, the air tends to go directly to the surface. The offset baffles 56, 58 and 60 force the air to take a diverted path through the mixture thus giving the effluent more oxygen so that the digestion process works more efficiently. In effect this is stepped aeration of the effluent which agitates the effluent in each portion of the aeration chamber 28 intermediate the baffles and the bottom 12. With the effluent in constant agitation the effluent is drawn into the various portions of the aeration chamber 28 through the outlet of leg 50 of pipe 44 as well as apertures 52 and 54 communicating with the upper portions of aeration chamber 28. The stepped aeration chamber 28 shown herein effectively increases the total height of the aeration path to provide rapid and complete mixing of the effluent therein to maintain particles therein in a state of suspension. Overflow from aeration chamber 28 then passes through the opening of leg 88 of pipe 86 into clarifying chamber 30 where the fluid is motionless. Any suspended solids that are left drop back to the aeration chamber 28 by the sloping hopper-shaped surface of end wall 20 through opening 36 which interconnects clarifying chamber 30 and aeration chamber 28. Thus extended aeration is provided in a recirculating manner for heavier particles of suspended solids that may come into the clarifying chamber 30. The effluent in the clarifying chamber 30 is then skimmed by means of the short leg 98 of pipe 96 having the lower edge thereof generally even with the effluent level 48, the skimmed effluent then passing into a completely separate compartment of chlorine tank 98 for further treatment. The chlorinator 112 automatically feeds chlorine into the fluid contained within chlorine tank 92, periodically and as required. As the level of effluent within chlorine tank 92 increases to a certain level a float switch (not shown) then activates the pump 104 to pump the effluent out of chlorine tank 92 through pipe 108 through diatomaceous earth filter 106 through outlet line 110 and out into leaching fields or other forms of disposal as required by local ordinances.

With the chlorine tank 92 inwardly disposed from end wall 20 the fluid contained in chlorine tank 92 is less subject to freezing. This is especially important inasmuch as the fluid contained in the chlorine tank would have the highest percentage of purity and therefore would be more subject to freezing. Where the chlorinating feature is not desired, the chlorine tank 92 may be used as an additional clarifying tank from which the fluid therein may be either pumped out or removed by other suitable means into leaching fields or other disposal means.

In an alternate arrangement where the chlorine tank 92 is not utilized, end wall 20 can be provided with an outlet pipe extending therethrough at the same horizontal level as leg 98 of pipe 96 to provide the same skimming action. Alternatively a skimming weir can be provided within clarifying chamber 30 adjacent an outlet pipe to accomplish the same result with the outlet pipe communicating with leaching fields or other disposal means.

Figure 6:
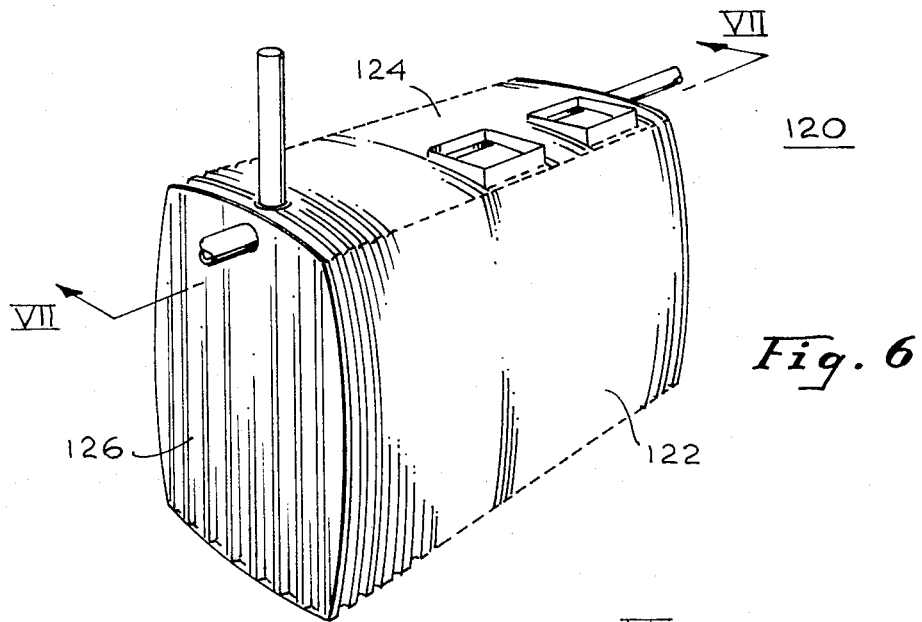
FIG. 6 is an isometric view, partially broken away, of an alternative arrangement of a sewage treatment vessel in accordance with the invention.
Figure 7:
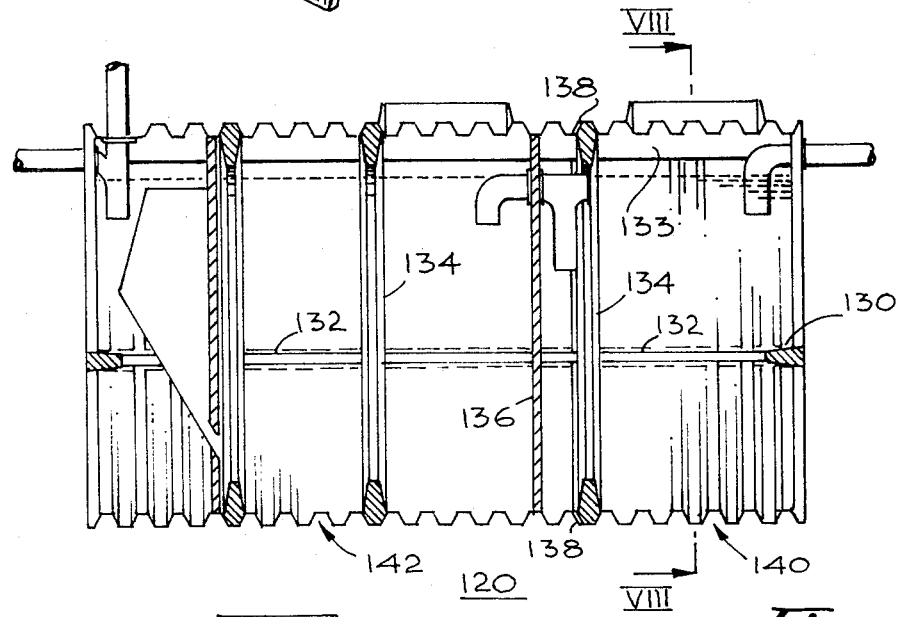
FIG. 7 is a cross-sectional view taken along the line VII—VII of FIG. 6.
Figure 8:
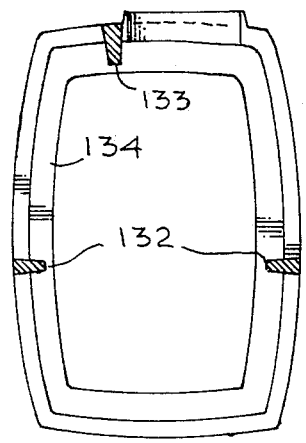
FIG. 8 is a cross-sectional view taken along the line VIII—VIII of FIG. 7.

An alternative construction of a sewage treatment vessel in accordance with the invention is represented in FIGS. 6, 7 and 8. As shown therein, the vessel 120 includes a side wall 122, a top 124 and an end wall 126. The structure as illustrated in FIG. 6, except for the end walls and projecting connections, may be fabricated upon a plug type mold utilizing a fiberglass spray up method, using polyester resins and glass roving fed into a chopper gun. The mold is formed to develop the corrugated shape for added strength. End sections such as 126 having a similar corrugated shape are fabricated in similar fashion and fixed in place. In accordance with an aspect of the invention, additional structural strength is provided by the use of V-beams 130 and 132 across the ends and along the sides interconnected with V-shaped ring beams 134 encircling the interior of the structure at selected positions along its length, as indicated in FIG. 7. A V-beam 133 is also provided for reinforcement along the top. The bulkheads 136 separating the respective compartments may be placed as desired. If appropriate, bulkheads may coincide with the position of the ring beams 134, but it is not necessary that they be so positioned.

Utilizing the V-beam reinforcement design as indicated in FIGS. 6–8 constitutes an economical method of getting increased strength and rigidity from a thin section. The shape of the reinforcing beams is curved to put the stress forces more in compression and tension than in bending, thus reducing the deflection under load. The ring beams 134 and longitudinal stringers 130, 132 and 133 add to the strength and cut the deflection to a minimum. The ring beams 134, being part of the total load structure between longitudinal beam sections, can be spaced at intervals for maximum design spacing. If desired, like sections taken from the same plug mold may be joined together to form a larger, more extended and continuous unit for additional capacity from what is essentially the same structural design. Thus, as illustrated in FIG. 7, a joint 138 is established where a modular section 140 is joined to the remainder 142 of the vessel 120 to provide increased capacity. Bulkheads, longitudinal stringers and other interior components may be added after the vessel exterior is fabricated.

Except for the difference in manner of the fabrication, the sewage treatment vessel of FIGS. 6–8 has essentially the same internal layout as has the configuration shown in FIGS. 1–3, although the vessel of FIGS. 6–8 is not shown including the various baffles of the stepped aeration system which is illustrated in FIG. 4.

Thus, although there have been described above specific arrangements of a sewage treatment vessel in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

I claim:

1. A sewage treatment structure comprising:
    a vessel having front, rear, side, top and bottom walls, said rear wall having an inclined surface extending upwardly and outwardly from said bottom wall;
    a first transverse partition connected to said side and bottom walls to define a first chamber between said partition and said front wall;
    a second transverse partition connected to said side walls intermediate said first partition and said rear wall to form a second and third chambers interconnected by an elongate opening between said bottom wall and the lower edge of said second partition, said third partition being defined by said second partition and said rear wall;
    a plurality of staggered generally horizontally extending baffles within said second chamber secured to at least one of said side walls and said first and second partition;
    sewage inlet means for introducing sewage into said first chamber;
    pipe means interconnecting said first and second chambers, said pipe means having other means for introducing liquid into said second chamber at various levels adjacent the bottom and intermediate said baffles;
    aeration means within said second chamber adjacent said bottom wall thereof;
    an overflow pipe extending through said second partition, said overflow pipe having a downwardly depending leg portion, the opening of which terminates adjacent said rear wall; and
    means for withdrawing liquid from said third chamber.

2. The combination according to claim 1 wherein said interconnecting pipe means is an inverted generally J-shaped pipe being open at both ends, the long leg thereof extending downwardly into said second chamber, said long leg being provided with apertures within each portion of said second chamber intermediate said plurality of baffles.

3. The combination according to claim 2 wherein said aeration means includes an elongate pipe disposed generally parallel to and adjacent said bottom wall, said elongate pipe having a plurality of spaced apertures along the length thereof.

4. The combination according to claim 1 wherein each of said side, top, and bottom walls has a concave inner surface.

5. The combination according to claim 4 wherein each of said side, top, bottom, front, and rear walls are provided with reinforcing ribs.

6. The combination according to claim 5 wherein said vessel is constructed of fiberglass and said first and second partitions are provided with reinforcing bulkheads.

7. The combination according to claim 1 wherein said third chamber includes tank means having as one wall thereof said second partition, said tank means having interconnecting skimming means for receiving fluid therein.

8. The combination according to claim 7 further including means for chlorinating the fluid received in said tank means.

9. The combination according to claim 7 further including pumping means for withdrawing chlorinated liquid from said tank means.

* * * * *